Figure 1:
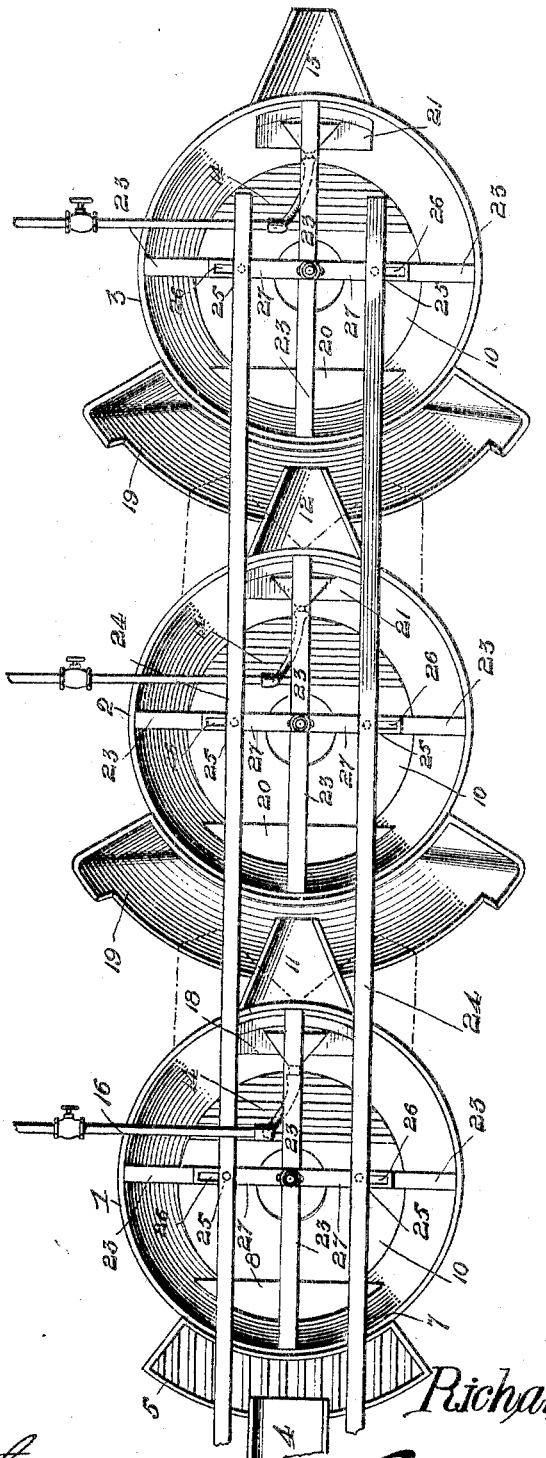

No. 793,945. PATENTED JULY 4, 1905.
R. T. MARSHALL.
GOLD SEPARATOR AND CONCENTRATOR.
APPLICATION FILED JUNE 1, 1904.

2 SHEETS—SHEET 2.

Witnesses:

Richard T. Marshall,
Inventor,
by C. A. Snow & Co.
Attorneys.

No. 793,945.    Patented July 4, 1905.

UNITED STATES PATENT OFFICE.

RICHARD T. MARSHALL, OF MERION STATION, PENNSYLVANIA.

GOLD SEPARATOR AND CONCENTRATOR.

SPECIFICATION forming part of Letters Patent No. 793,945, dated July 4, 1905.

Application filed June 1, 1904. Serial No. 210,699.

*To all whom it may concern:*

Be it known that I, RICHARD T. MARSHALL, a citizen of the United States, residing at Merion Station, in the county of Montgomery and State of Pennsylvania, have invented a new and useful Gold Separator and Concentrator, of which the following is a specification.

This invention relates to gold separators and concentrators, although the same is adapted for use in the concentration of sulfid ores.

The object of the invention is in a ready, rapid, and certain manner to effect precipitation and saving of practically all of the flour or free gold contained in gold-bearing ores and to accomplish these results by the employment of mechanism that from the simplicity of its construction will not be liable to get out of repair from long-continued use.

The invention consists, generally stated, in a plurality of horizontally-oscillatory pans, each having communication with the adjacent pan and each pan of the series from the first pan being arranged on a lower plane, thereby to cause an automatic discharge of the material from the first to the last of the series of pans, there being provided in connection with the first pan an amalgam surface to catch and retain the bulk of any fine and flour gold that may be fed thereto. Combined with each pan of the series is a water-supply pipe which is so disposed as to cause a rapid discharge into the next succeeding pan of tailings without causing any carrying over of the concentrates, these by their superior gravity settling to the bottom of the first pan. Provision is made, however, by which any concentrates carried over from one pan to another will be retained, so that the material escaping from the last pan of the series will be nothing more than gangue, and therefore worthless.

One of the essential features of the invention is the provision of means whereby a partial horizontal rotation may be effected to each of the pans, causing thereby a centrifugal movement of its contents, which will result in floating the gangue or worthless portion of the contents toward the top, whence it is discharged into the next succeeding pan, the heavier or gold-bearing portion of the contents being precipitated and saved.

To effect the initial catching and retention of any flour or free gold present in the concentrates, there is combined with the intake-mouth of each pan a lip or deflector which will operate to check the material from rising to the top of the water contained within it, thereby giving the heavier material time to settle to the bottom before it can escape to the next succeeding pan. To accentuate this saving action, the lip may be provided on its under side with detachable amalgam-plates, against which the free and flour gold will impinge and be retained on its initial entry. After the gangue and any gold that may be associated therewith passes to the succeeding pan it may be subjected to like action at its point of entry, so that by the time it reaches the last pan of the series all of the gold contained will have been separated and trapped.

In order still further to secure retention of the free gold present, the discharge side of each pan is made lower than its feed side, causing the heavier particles, which are gold-bearing, to settle to the lower side and be retained, any heavier particles carried over to the next succeeding pan being caught in a like manner, and to effect a still further saving of the gold riffles may be arranged at the lowest portion of each of the pans.

Further and more specific details of construction will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

Figure 2:
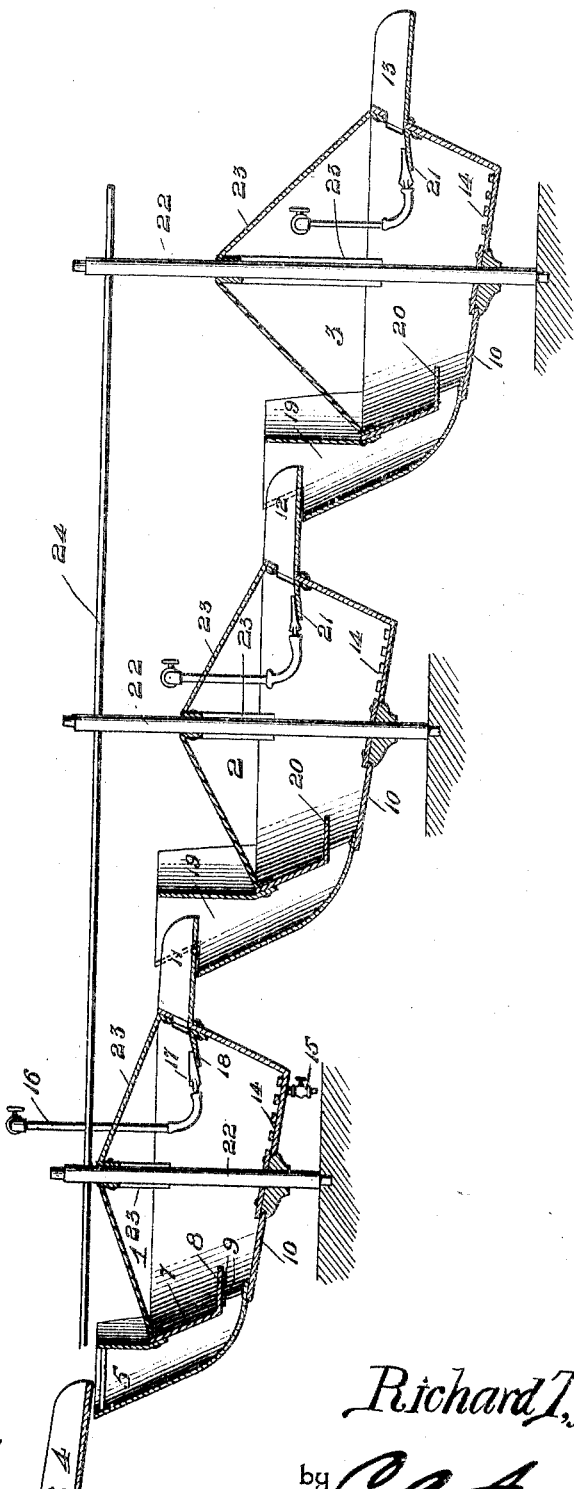

In the drawings, Figure 1 is a view in plan of a gold separator and concentrator embodying the essential features of the present invention. Fig. 2 is a view in sectional elevation of the same.

Referring to the drawings, 1, 2, and 3 designate three pans to receive the gold-bearing earth, which is fed to the first pan through a spout 4, which discharges into a semicircular hopper 5, projecting upward at an angle to the first pan 1. The mouth of the hopper may be provided with a grid 6, which will serve to separate out any heavier lumps of material or rocks which might otherwise find entry to the pans and could not be successfully operated upon therein. The rear wall 7 of the hopper terminates in a horizontally-disposed lip 8, which may be either integral with the partition or detachably connected therewith and constitutes a deflector to cause the entering material to be projected toward the bottom of the pan, and in order to catch any free or flour gold present in the entering material the under side of this lip may be provided with amalgam-plates 9. Each of the pans is provided with an inclined bottom 10, the lower side of which is disposed toward the discharge-spouts 11, 12, and 13, and if found necessary or desirable at the lowest side of each of the pans riffles 14 may be provided for the usual purpose. The pan 1 is provided in its bottom portion with a valved discharge-pipe 15, through which concentrates may be removed, and where sulfid ores are operated upon this pipe may be constantly left open a small way.

Water is supplied to the spouts through pipes 16, communicating with a suitable source of supply, each having its lower end provided with a flat nozzle 17, which discharges upon a lip 18, projecting inward and downward from the pan 1 adjacent to the spout 11. The flow of water through the nozzle will operate to carry over into the pan 2 all of the floating material and gangue without disturbing that which has already settled in the bottom of the pan 1. Each of the pans 2 and 3 is provided with a hopper 19 similar to the hopper 5 of the tank 1, with a lip 20 similar to the lip 8, and with a lip 21 similar to the lip 18.

The pans are supported upon vertical shafts 22, stepped in suitable boxes, and the shafts and pans are connected through the medium of braces 23, one end of each of which is secured to the shaft and the opposite end to the pans. Oscillatory movement is imparted to the series of pans through the medium of two rods 24, which are provided with pins 25 to engage slots 26 in arms 27, carried by the shafts 22, said rods being actuated from any suitable source of power, such as cranks, eccentrics, or any other medium that will impart the desired movements to the pans.

As shown in Fig. 1, the spouts 11, 12, and 13 are tapered and the chutes 5 and 19 are approximately semicircular in form, and by this arrangement the material discharged from one pan into another will be caught and directed to the point of discharge without danger of loss. By disposing the pans on different levels from the pan 1 to the pan 3, the latter being the lowest, there will be a continuous discharge of water and tailings from the different pans to the point of discharge, and owing to the oscillatory movement given to the pans the contents will be positively agitated, and thus cause separation therefrom of the heavier or gold-bearing portion of the ores, which will settle to the bottom of the pans, while the lighter portions will pass over the next succeeding pan, and so on, until the last pan, where the material escaping will be mere tailings and practically of no value.

The pans may be made of any material, preferably of heavy steel, and all the fittings employed will be constructed with a view to solidity, to long-continued use without danger of breakage, and readiness of repairs in case of damage.

Having thus described the invention, what is claimed is—

1. A machine of the class described comprising a plurality of pans, each of which is provided with an inclined bottom, with a semicircular hopper discharging onto the bottom, and with a spout projecting into the hopper of the next adjacent pan, a lip projecting inward from the hopper, and the spout, and the amalgam-plates carried by the hopper-lip and the first pan of the series.

2. A machine of the class described comprising a plurality of inverted-ungula-shaped pans, each of which is provided on one side with a semicircular hopper discharging onto the lower portion of the pan, a spout projecting into the hopper of the next adjacent pan, transversely-disposed deflecting-lips arranged adjacent to the discharge-mouths of the hoppers and the spouts, amalgam-plates carried by one of the hopper-lips, and riffles disposed on the lower side of the pan.

3. A machine of the class described comprising a plurality of pans each provided with a semicircular hopper and with a discharge-spout projecting into the hopper of the next adjacent pan, a lip disposed adjacent to the discharge-spout, a flat nozzle disposed upon the lip, and means for supplying water to the nozzle.

In testimony that I claim the foregoing as my own I have hereto affixed my signature in the presence of two witnesses.

RICHARD T. MARSHALL.

Witnesses:
J. I. LINEAWEAVER,
JOHN RODGERS.